UNITED STATES PATENT OFFICE.

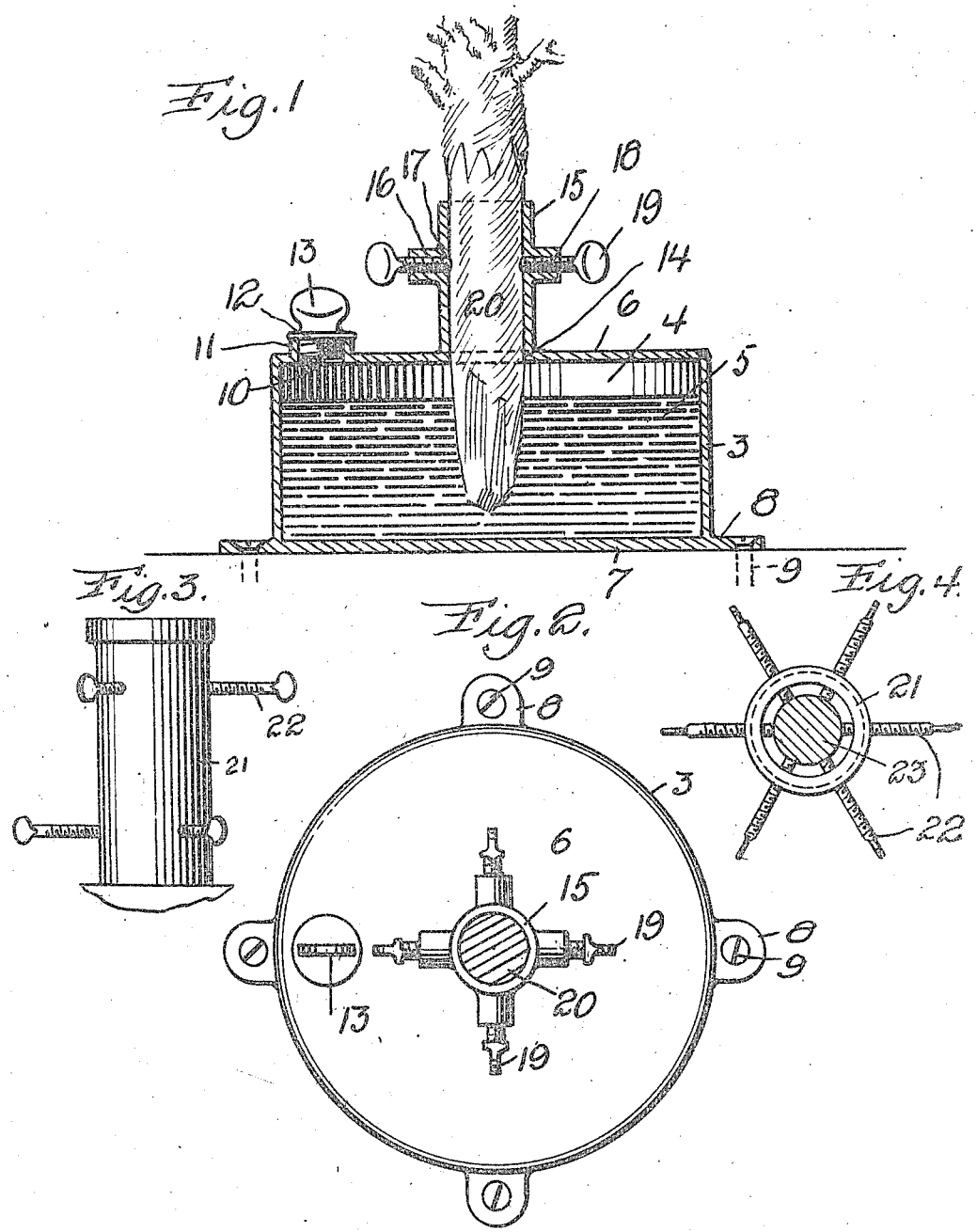

CARL A. DIEDERICHS, OF PITTSBURGH, PENNSYLVANIA.

CHRISTMAS-TREE HOLDER.

1,160,698.

Specification of Letters Patent.

Patented Nov. 16, 1915.

Application filed January 24, 1914. Serial No. 814,114.

*To all whom it may concern:*

Be it known that I, CARL A. DIEDERICHS, a citizen of the United States of America, residing at Pittsburgh, in the county of Allegheny and State of Pennsylvania, have invented certain new and useful Improvements in Christmas-Tree Holders, of which the following is a specification, reference being had therein to the accompanying drawing.

This invention relates to Christmas tree holders, and has for its object to provide a device of such class, in a manner as hereinafter set forth for not only maintaining the Christmas tree in an upright position, but further provided with means to constitute a reservoir containing water into which the trunk of the tree extends whereby the tree is maintained in a fresh condition.

A further object of the invention is to provide a Christmas tree holder, in a manner as hereinafter set forth, whereby trees having different diameters of trunks can be maintained in an upright position.

Further objects of the invention are to provide a Christmas tree holder, which is simple in its construction and arrangement, durable, efficient and convenient in its use, readily set up and comparatively inexpensive to manufacture.

With the foregoing and other objects in view, the invention consists of the novel construction, combination and arrangement of parts as hereinafter more specifically described and illustrated in the accompanying drawings, wherein is shown an embodiment of the invention, but it is to be understood that changes, variations and modifications can be resorted to which come within the scope of the claim hereunto appended.

In the drawings wherein like reference characters denote corresponding parts throughout the several views:—Figure 1 is a vertical sectional view of Christmas tree holder in accordance with this invention, showing the adaptation thereof in connection with a trunk of a tree. Fig. 2 is a top plan view of a holder, the trunk of the tree being in section. Fig. 3 is an elevation of a modified form of sleeve and arrangement of clamping screws, and Fig. 4 is a top plan view of the form shown in Fig. 3.

Referring to the drawings in detail, 3 denotes a hollow cylindrical base which provides a reservoir 4 adapted to normally contain a body of water 5. The base 3 is closed at its top and bottom as at 6—7 respectively and the bottom 7 of the base 3 is formed with laterally extending apertured spaced lugs 8, through which extend holdfast devices 9 for detachably securing the base 3 to a suitable support. The base 3 is preferably formed of metallic material and has the top 6 thereof provided with a filling opening 10, the wall of which registers with a collar 11, the latter being formed integral with the top 6 and is interiorly threaded. Detachably engaging with the threads of the collar 11 is a peripherally threaded plug 12 having a flanged finger piece 13. When the plug 12 is removed, the reservoir 4 can be filled with water.

The top 6 of the reservoir 4, centrally of said top is provided with an opening 14, and formed integral with said top 6, is a vertically disposed sleeve 15, preferably cylindrical in cross section. The inner face of the sleeve 15 forms a continuation of the wall of the opening 14 and said sleeve 15 intermediate its ends is provided with a series of laterally extending interiorly threaded collars 16, which register with the openings 17 formed in the sleeve 15. Adjustably engaging in the threaded collar 16 and capable of extending into the sleeve 15 are clamping screws 18 provided with thumb pieces 19. The screws 18 are employed for clamping the trunk 20 of a tree to a holder. The trunk extends down through the sleeve 15 and into the water 5.

In the drawings, the trunk 20 of the tree is shown as filling the sleeve 15, but it is obvious that a trunk of a reduced diameter with respect to the diameter of the sleeve 15 can be secured to the holder through the medium of the clamping screws 18, or in other words, the clamping screws 18 in connection with the collar 16 and sleeve 15 provides means for securing trees in position having trunks of varying diameters. The clamping screws 18 also provide means for securing the trunk of the tree centrally with respect to the sleeve 15.

In Figs. 3 and 4 the sleeve is indicated by the reference character 21 and the clamping screws by the reference character 22. Two sets of clamping screws are employed, one set being arranged above the other and with the screws of the upper set out of vertical alinement with respect to the screws of the lower set. In the form shown in Figs. 3 and 4, the sleeve 21 is not provided with the collars or bosses 16, but the material from which the sleeve is constructed is of sufficient thickness so that the necessary number of threads on the walls of the openings through which the clamping screws extend can be provided. As illustrated in Figs. 3 and 4, the trunk of the tree is indicated by the reference character 23 and is of materially less diameter than the inner diameter of the sleeve. The trunk of the tree is maintained in position by the clamping screws 23.

What I claim is:—

A Christmas tree holder comprising a hollow cylindrical base closed at its bottom and having its top provided with a centrally disposed opening, said base constituting a reservoir, a vertically extending sleeve integral with the top of the base and registering with said opening and formed of material of greater thickness than the material from which the base is made, a series of laterally adjustable clamping screws carried by the sleeve and capable of engaging the trunk of a tree for clamping it to a sleeve, said sleeve of greater height than said base, and a series of laterally extending spaced apertured lugs projecting from the bottom of the base and through which is adapted to extend hold fast devices for fixedly securing the base to a support.

In testimony whereof I affix my signature in the presence of two witnesses.

CARL A. DIEDERICHS.

Witnesses:
NICHOLAS L. BOGAN,
CARL A. DIEDERICHS, Jr.